(12) United States Patent
Ghosh et al.

(10) Patent No.: US 10,225,851 B2
(45) Date of Patent: Mar. 5, 2019

(54) MULTI-CAST LONG RANGE LOW POWER ACCESS POINT

(71) Applicant: Intel Corporation, Santa Clara, CA (US)

(72) Inventors: Chittabrata Ghosh, Fremont, CA (US); Hassnaa Moustafa, Portland, OR (US); Stephen T. Palermo, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/487,670

(22) Filed: Apr. 14, 2017

(65) Prior Publication Data

US 2018/0302909 A1   Oct. 18, 2018

(51) Int. Cl.
*H04W 72/12* (2009.01)
*H04W 88/08* (2009.01)

(52) U.S. Cl.
CPC ..... *H04W 72/121* (2013.01); *H04W 72/1252* (2013.01); *H04W 88/08* (2013.01)

(58) Field of Classification Search
CPC ........... H04W 72/121; H04W 72/1252; H04W 88/08
See application file for complete search history.

(56) References Cited

U.S. PATENT DOCUMENTS

| 7,817,579 | B2 | 10/2010 | Ramirez, II et al. |
| 8,054,817 | B2 | 11/2011 | Zhu et al. |
| 8,400,991 | B2 | 3/2013 | Trachewsky et al. |
| 9,072,101 | B2 | 6/2015 | Walton et al. |
| 2016/0050622 | A1 | 2/2016 | Azizi et al. |
| 2017/0272976 | A1* | 9/2017 | Yang ................... H04W 28/065 |

OTHER PUBLICATIONS

Godfrey, Tim, "Long Range Low Power (LRLP) Operation in 802.11: Use Cases and Functional Requirements: Guidelines for PAR Development", doc.: IEEE 802.11-15/1181r0doc.:, (Mar. 2016), 10 pgs.

* cited by examiner

*Primary Examiner* — Dady Chery
(74) *Attorney, Agent, or Firm* — Schwegman Lundberg & Woessner, P.A.

(57) ABSTRACT

System and techniques for a multi-class Long Range Lower Power (LRLP) access point (AP) multifactor intelligent agent control are described herein. A station (STA) association at the AP is received. Here, the association includes Class Identifier (ID) information. The Class ID information encompasses a set of communication parameters. A schedule of LRLP and non-LRLP STAs with associations at the AP is maintained. A transceiver chain is modified based on the schedule and the set of communication parameters to complete a communication with the STA.

24 Claims, 7 Drawing Sheets

MULTI-CAST LONG RANGE LOW POWER ACCESS POINT

TECHNICAL FIELD

Embodiments described herein generally relate to wireless networking and more specifically to a multi-class Long Range Low Power (LRLP) access point (AP).

BACKGROUND

Radio frequency (RF) wireless communication involves the modulation of radio waves to communicate information. A popular protocol for RF communication is standardized in the IEEE 802.11 family of standards. 802.11 communication typically involves radio allocation in the 2.4 gigahertz (GHz) and 5 GHz frequency spectrum. Channel widths are typically allocated in twenty megahertz (MHz) or forty MHz blocks. 802.11 employs a number of other radio spectrum efficiency and error correction techniques such as multi-input-multiple-output (MIMO) special coding or beamforming, orthogonal frequency-division multiplexing (OFDM), etc. Operational ranges for 802.11 tend to be around 100 meters (e.g., short range RF), generally distinguishing 802.11 from other techniques, such as cellular standards (e.g., the 3GPP family of standards) that may have ranges measured in kilometers (e.g., long range RF), or near field techniques (e.g., radio frequency identifier (RFID), near field communications (NFC), etc.) that may have ranges measured in meters or even centimeters (e.g., close range).

A group of devices that may employ a number of RF communications are known as Internet of Things (IoT) devices. IoT devices share an ability to communicate but otherwise may cover a wide range of functions, such as remote sensing (e.g., pipeline monitors, gas meter readers, etc.), to security (e.g., cameras, alarms, etc.), to automation (e.g., heating systems, lighting systems, etc.). Many IoT devices are designed to operate on battery power for extended periods of time while others are connected to mains power. Further, some IoT devices may have predictable communications periods (e.g., reporting a gas meter reading once a month) while others may have unpredictable event-driven communications (e.g., an alarm being triggered).

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

IoT devices are generally useful when they connect to a larger network to permit the use of information generated at the devices. Although mesh networks are possible, IoT devices typically connect to a larger network at some juncture, such as via a base station (e.g., 3GPP endpoint) or an AP (e.g., 802.11 endpoint). APs have enjoyed wide deployment in homes and businesses causing them to be a good endpoint to larger networks. However, APs tend to be arranged to deliver high availability and throughput, which may not be used by many IoT devices and also increase power consumption and RF spectrum inefficiency.

The IEEE 802.11 standards body is looking into different solutions to better handle IoT device communication. In this context, Long Range Low Power (LRLP) Interest Group (IG) has been formed to enable improved low power operation for 802.11 IoT devices. The LRLP IG is also looking into extending the range of operation IoT devices. The deliberations are not contemplating new RF frequencies for this effort, but rather retain the 2.4 GHz and 5 GHz bands for device operation. This decision will facilitate co-existence of new IoT devices and legacy 802.11 devices. Although LPLR devices may co-exist with other 802.11 compliant devices, operation of LPLR devices may use different radio parameters, such as a narrow bandwidth (e.g., 2 MHz channels).

Although the LRLP IG contemplates a number of changes to allow the interoperation of LRLP and other 802.11 devices, AP implementation details are not provided. What is needed is a flexible AP architecture to address the varied RF communications changes to allow LRLP devices and legacy 802.11 devices to both use common APs (e.g., one platform to support both types of stations (STAs)). This flexible architecture may include a resource conscious scheduler and a configurable transceiver chain (e.g., the hardware elements between a controller and an antenna array) to adapt to a variety of communications parameters while maintaining RF spectrum efficiency. To achieve this goal, APs may employ software defined radios on the same equipment that use partitioned virtual machines (VMs) with hardware subscription—that is a virtual machine may subscribe to certain hardware resources, such as field programmable gate arrays (FPGAs), to implement a transceiver chain—to adapt to and control multi-range IoT devices, including LRLP devices, as well as 802.11 legacy devices. The software radios permit reconfiguration over time to adjust (e.g., bandwidth or channel allocation) to differing workloads. Thus, the AP may implement a scheduler to control the software radios to vary bandwidth scheduling between narrowband LRLP STAs and wideband legacy STAs. This supports coexistence of both high efficiency and low power 802.11 networks.

Figure 1:
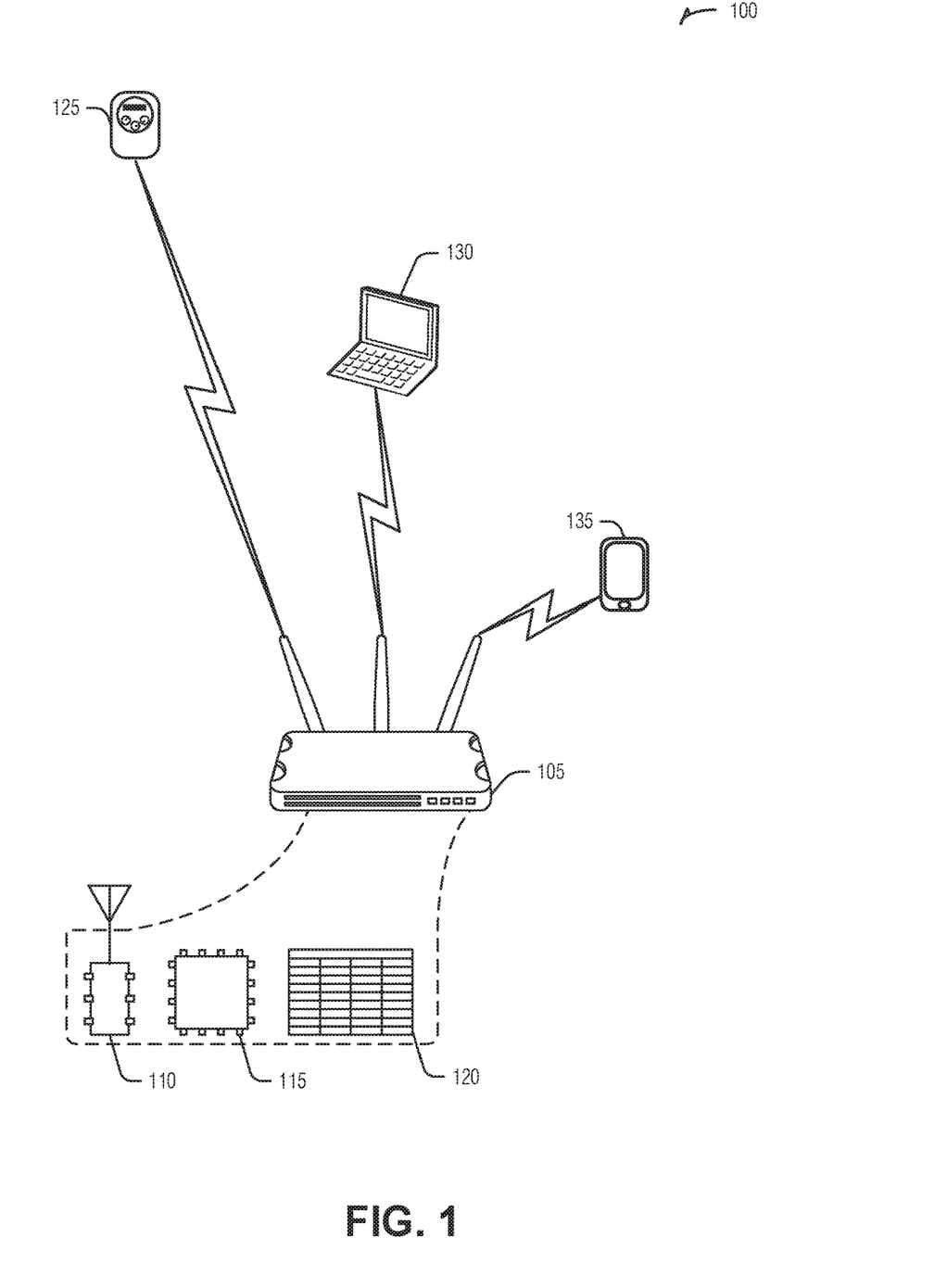
FIG. 1 is a block diagram of an example of an environment including a system for a multi-class LRLP AP, according to an embodiment.

FIG. 1 is a block diagram of an example of an environment 100 including a system 105 for a multi-class LRLP AP, according to an embodiment. The system 105 includes a transceiver chain 110, a controller 115, and a schedule 120.

The transceiver chain 110 includes hardware to implement RF encoding and transmission, such as a digital signal processor (DSP), tuner, base-band to pass-band frequency modulation, etc. The controller 115 includes a hardware processor and may also include computer readable media, or other support hardware. The schedule 120 is maintained by the controller 115 in a computer readable medium of the system 105. The system 105 is a component of an 802.11 AP.

The controller 115 is arranged to receive, via the transceiver chain 110, a STA association at the AP. STA association is a typical registration of a STA to an AP that wishes to use the AP. This particular STA association Class Identifier (ID) information. The Class ID information provides a set of communication parameters for the STA. The communication parameters provide specific details about communications with the STA that, for example, the AP would otherwise be unaware. In an example, the communication parameters include a maximum or a minimum bandwidth. In an example, the communication parameters include a reporting interval. Reporting intervals may include values such as yearly, monthly, hourly, etc. In an example, the communication parameters include a power-type. Example power-types may include mains power, battery power, etc. In an example, a battery power type may include sub-types indicating, for example, remaining power, or other characteristics of a battery being used.

In an example, with respect to the association, wherein non-LRLP STAs do not submit a Class ID during association. Thus, the inclusion of the Class ID information in the association designates the STA as an LRLP STA. As illustrated in FIG. 1, the gas meter 125 is an example of an LRLP STA while the laptop computer 130 and the NFC payment device 135 are examples of non-LRLP STAs (respectively a short range device and a close range device). In an example, non-LRLP STAs and the AP communicate in accordance with an 802.11 family of standards. This is otherwise referred to herein as legacy communication.

The controller 115 is also arranged to maintain the schedule of LRLP and non-LRLP STAs, including the STA that made the association, with associations at the AP. The schedule 120 coordinates bandwidth allocations to different STAs in time. In an example, to maintain the schedule of LRLP and non-LRLP STAs with associations at the AP, the controller 115 schedules multiple LRLP STAs on different bandwidths at the same time. Here, any single bandwidth allocation to the multiple LRLP STAs is less than a smallest bandwidth allocation to a non-LRLP STA at a different time. In an example, the smallest bandwidth allocation to a non-LRLP STA at the AP is twenty megahertz. Thus, legacy 20 MHz bands are subdivided by the controller 115 and allocated to multiple LRLP STAs at the same time (e.g., different sub-bands to different LRLP STAs).

The precise bandwidth allocations provided by the controller 115 to different LRLP STAs may be driven by the Class ID information. Accordingly, a first STA may include a bandwidth range (e.g., 2 MHz to 10 MHz) in the Class ID information. In an example, the Class ID information does not include band details, but rather is a reference to a lookup available to the controller 115. Thus, upon receiving the Class ID information, the controller 115 lookups up the LRLP STA's parameters to ascertain that the STA may use between a 2 MHz and 10 MHz band. Other details, such as a reporting interval, etc., may also be used by the controller 115 to fill out the schedule. Thus, for example, a monthly reporting device may be given priority over another device in the schedule due to the infrequency of its reports. Priority information (e.g., a security or alarm type defined by the Class ID information) may also be considered by the controller 115 to, for example, allow a fire alarm to displace a gas meter reader in the schedule 120.

The controller 115 may also account for network utilization in the schedule 120. In an example, LRLP STA bandwidth in the schedule 120 is reduced from a maximum (for the STA) based on a cardinality (e.g., number of) of LRLP STAs in the schedule 120. Thus, the more LRLP STAs scheduled, the less bandwidth is allocated to any given LRLP STA. The minimum bandwidth allocation may be predetermined (e.g., a hard floor of 2 MHz) or based on the Class ID information. In an example, the controller 115 is arranged to reject new LRLP STA associations when the cardinality of the LRLP STAs in the schedule reaches a threshold. Thus, the AP may have a maximum number of associated LRLP STAs. In an example, the maximum number may be over all LRLP STAs or over particular types of STAs. Thus, an X number of STAs of a first type and a Y number of STAs of a second type may defines the maximums.

Schedule 120 management by the controller 115 permits coordination of bandwidth and demand amongst a variety of STAs. Once the bandwidth allocations and timing for communications are set in the schedule 120, the controller 115 may then manage hardware resources of the AP in order to effectuate RF communications with these devices. Because the radios typically use a number of hardware based processing in the receiver chain 110 to implement the RF communications-such as discrimination filters, pass-band to base-band converters, symbol resolution, discrete Fourier transforms (DFT), etc.—the system 105 may include a variety devices to address the differing bandwidth or encoding parameters of LRLP and non-LRLP STA communications. This, however, may inefficiently allocate chip space to redundant hardware.

To address hardware use in multiple radio use scenarios, the system 105 may include a variety of modular hardware elements that are used to modify the transceiver chain 110 during operation. These elements may include FPGAs, DSPs, or other components that may be communicatively assembled during operation by the controller 115 to implement different bandwidth allocations to the different STAs. In an example, the system 105 may include one or more virtual machines with associated hardware (e.g., hardware subscriptions) to implement different communication parameters. In an example, the controller 115, or other hardware of the system 105, includes hardware support for the virtual machines. Such hardware support may include separate register files for each virtual machine, different memory mappings, etc., to promote efficient context switching between the various virtual machines. Thus, the AP 105 is able to dynamically change and adapt to support multiple types of devices. The FPGAs may contain the separate images used for the different co-existing device types. Furthermore, an integrated FPGA+CPU—a device in which the processor and FPGA are coherently tied together with a high-speed interconnect—may be used to respond to the compute resources that use CPU (IA) cycles and FPGA (e.g., HW-acceleration).

As noted above, the controller 115 is arranged to modify the transceiver chain 110 based on the schedule and the set of communication parameters to complete a communication with the STA. In an example, the communication (e.g., being completed) is a downlink communication. In an example, to modify the transceiver chain based on the schedule, the controller 115 is arranged to configure a virtual machine to control an antenna used in the communication. In an example, configuring the virtual machine includes reconfiguring a FPGA to modify a signal to or from the antenna in accordance with a radio communication standard. In an example, configuring the virtual machine includes subscribing to a hardware resource of the AP, the subscription establishing a time-of-use window in which the virtual machine controls the hardware resource.

Providing reconfigurable hardware and a separation of concerns in virtual machines enables the system 105 to flexibly handle not only LRLP and legacy STAs, but also flexibly adapt to future device communications. Thus, efficient hardware and RF spectrum allocation is achieved via the system 105. Additional examples are discussed below.

Figure 2:
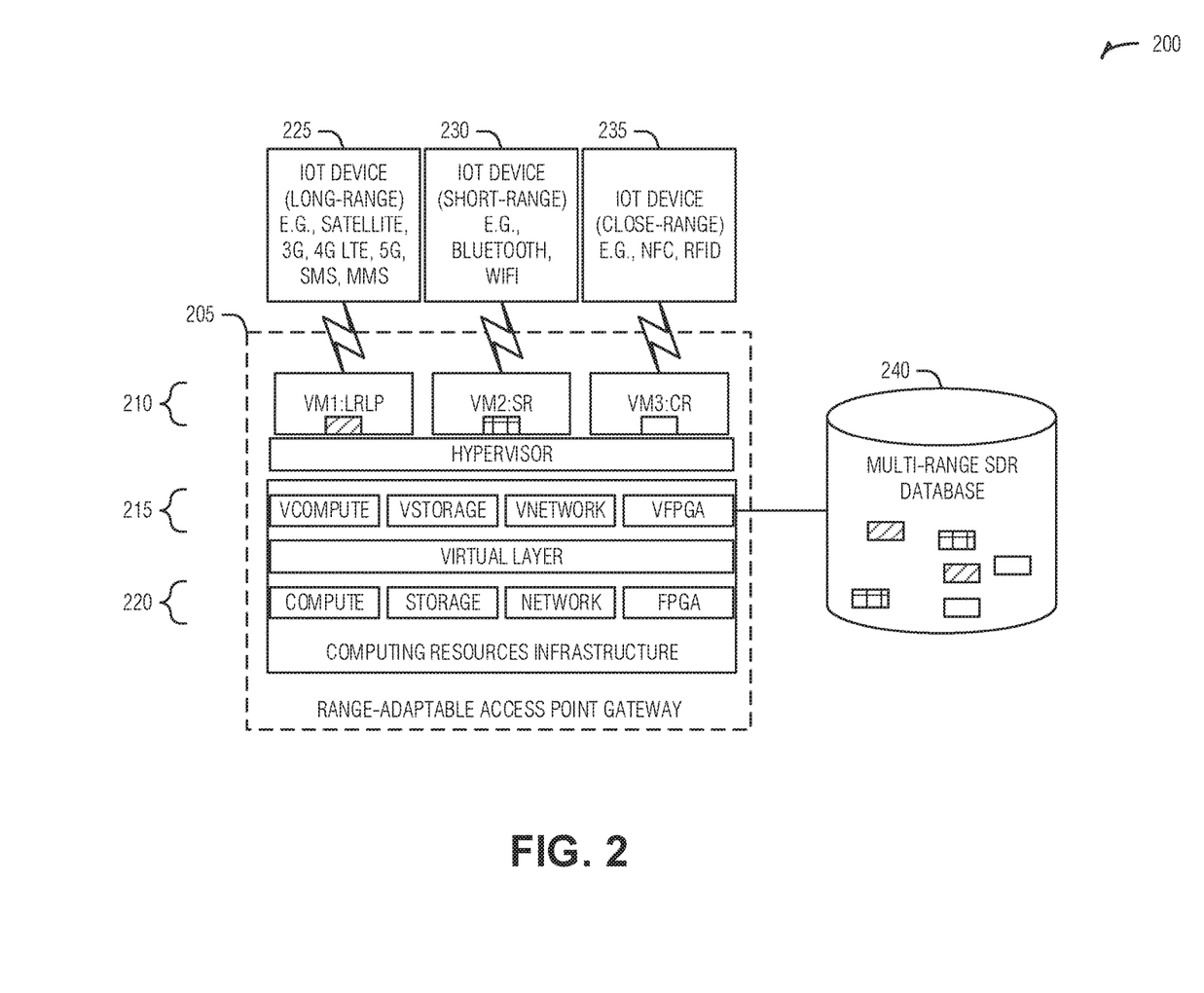
FIG. 2 illustrates a block diagram of an example of a system for a multi-class LRLP AP, according to an embodiment.

FIG. 2 illustrates a block diagram of an example of a system 200 for a multi-class LRLP AP, according to an embodiment. The components of the system 200 are implemented in hardware (e.g., circuitry). The system 200 includes an AP 205 to communicate with a variety of STAs, an LRLP STA 225, a short range STA 230, and a close range STA 235. The AP 250 includes a collection of virtual machines 210 with a member to support each of the STAs 225, 230, and 235. The collection of virtual machines 210 includes respective virtual hardware 215 that represents parts of actual hardware 220 in the AP to support the RF communications handled by the collection of virtual machine 210. The AP 205 may include, or be communicatively coupled to while in operation, a software defined radio (SDR) database 240. As illustrated, the software and hardware configurations are applied to a particular VM to implement communications with a particular type of STA. Thus, for example, the VM configuration for the LRLP STA 225 is represented as a block with diagonal stripes.

Figure 3:
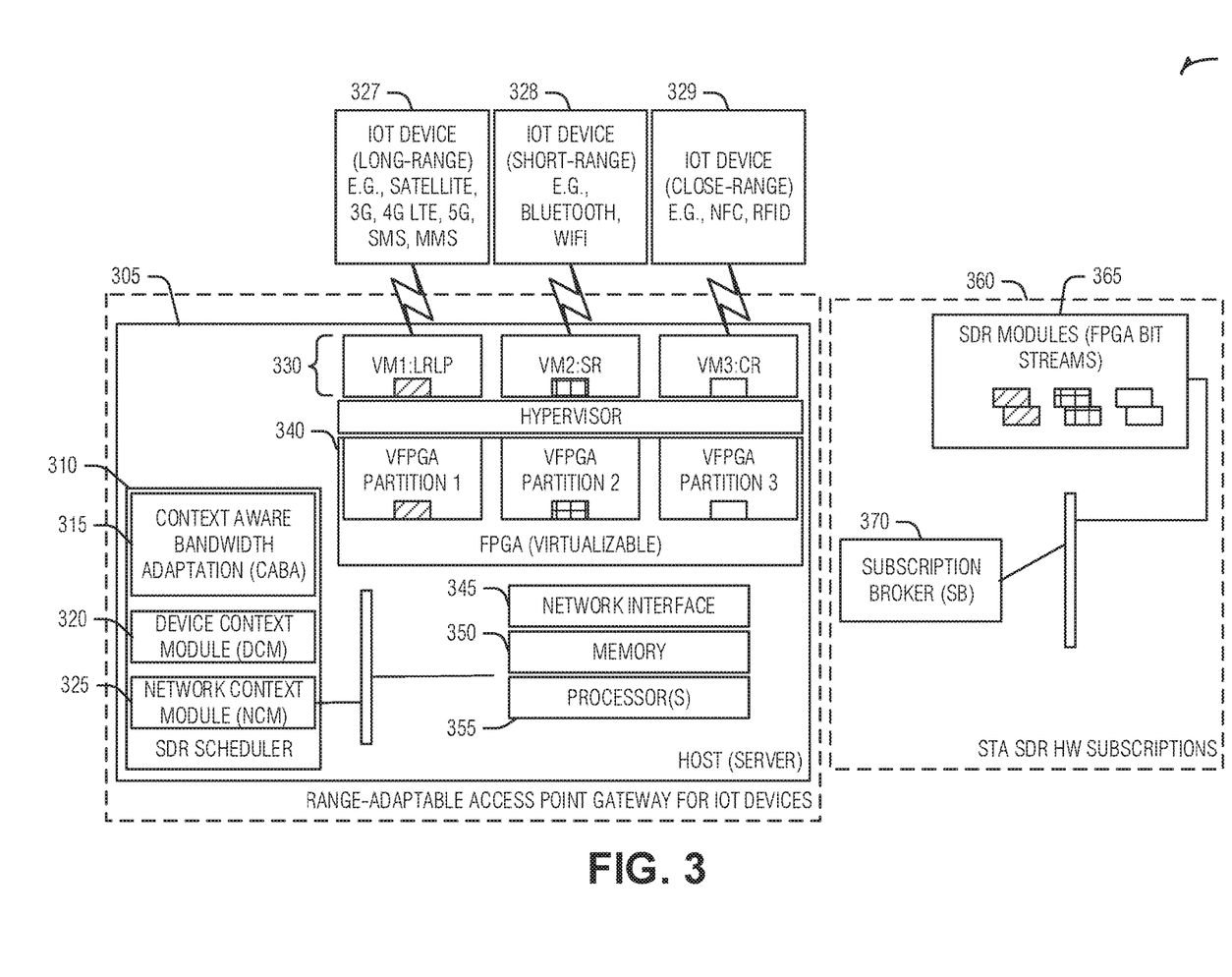
FIG. 3 illustrates a block diagram of an example of a system for a multi-class LRLP AP, according to an embodiment.

FIG. 3 illustrates a block diagram of an example of a system 300 for a multi-class LRLP AP, according to an embodiment. The system 300 includes a variation on the system 200 described above. Specifically, the system 300 includes a collection of virtual machines 330 in an AP 305 to respectively service a LRLP STA 327, a short range STA 328, and a close range STA 329. The collection of virtual machine 330 are also supported by virtualized hardware 340, here illustrated in the form of virtualized FPGAs. When in operation, the AP 305 may include or be communicatively coupled to a STA SDR hardware subscription database 360 that may include a subscription broker 370 to select and deliver SDR modules 365 to configure the virtualized hardware 340. The hardware virtualization may use a network interface 345, memory 350, and processors 355 of the AP 305.

The system 300 adds an SDR scheduler 310. The SDR scheduler 310 may include one or more of a context aware bandwidth adaption (CABA) controller 315, a device context module 320 (DCM), or a network context module 325 (NCM). These components operate to enable the SDR scheduler 310 to provide efficient scheduling of the variety of STAs associating to the AP 305.

The CABA 315 is arranged to adapt the schedule based on a transmission/reception schedule (e.g., every 1 hour) of the LRLP STA 327. Thus, the CABA 315 adjusts the allocation bandwidth based on when the LRLP STA 327 is expected to be sent a transmission or send a transmission to the AP 305. For example, within a schedule where LRLP devices are active, the CABA 315 dynamically adjusts the bandwidth of every Down Link (DL) frame compatible with LRLP devices based on the network context information (e.g., as obtained by the NCM 325). The CABA 315 adapts operation of each associated device to match the device's context/requirements and also to balance the bandwidth allocation among all devices.

The DCM 320 is arranged to collect and present STA information obtained during the STA association to the AP 305. If a device is LRLP (e.g., STA 327), then the association signals will include the device Class ID. In an example, LRLP STAs 327 may signal its device class ID (e.g., whether battery-constrained, coin-cell operated, rechargeable battery operated, or connected to mains power) in management frames. In an example, if the device is legacy 802.11 device (e.g., STA 328), the association will have the classical information and will not include the Class ID information. The DCM 320 provides continuous device-awareness with each device association. For example, the DCM 320 classifies STAs with corresponding wake-up schedules. This information may be consumed by the SDR scheduler 310 (e.g., via the CABA 310) for bandwidth allocation, antenna sharing, or spectrum sharing at scheduled periods of time (e.g., within or without LRLP scheduled windows).

The NCM 325 is arranged to monitor the AP's load, for example, in terms of number of connected devices or their allocated bandwidth. The SDR scheduler 310 uses the NCM 325 to continuously gather this information upon each device association.

By adding these additional components of the system 300 over that which is described with respect to the system 200, greater RF spectral efficiency may be achieved because LRLP STAs are organized to include bandwidth allocations less than that used by legacy STAs without wasting the bandwidth.

Figure 4:
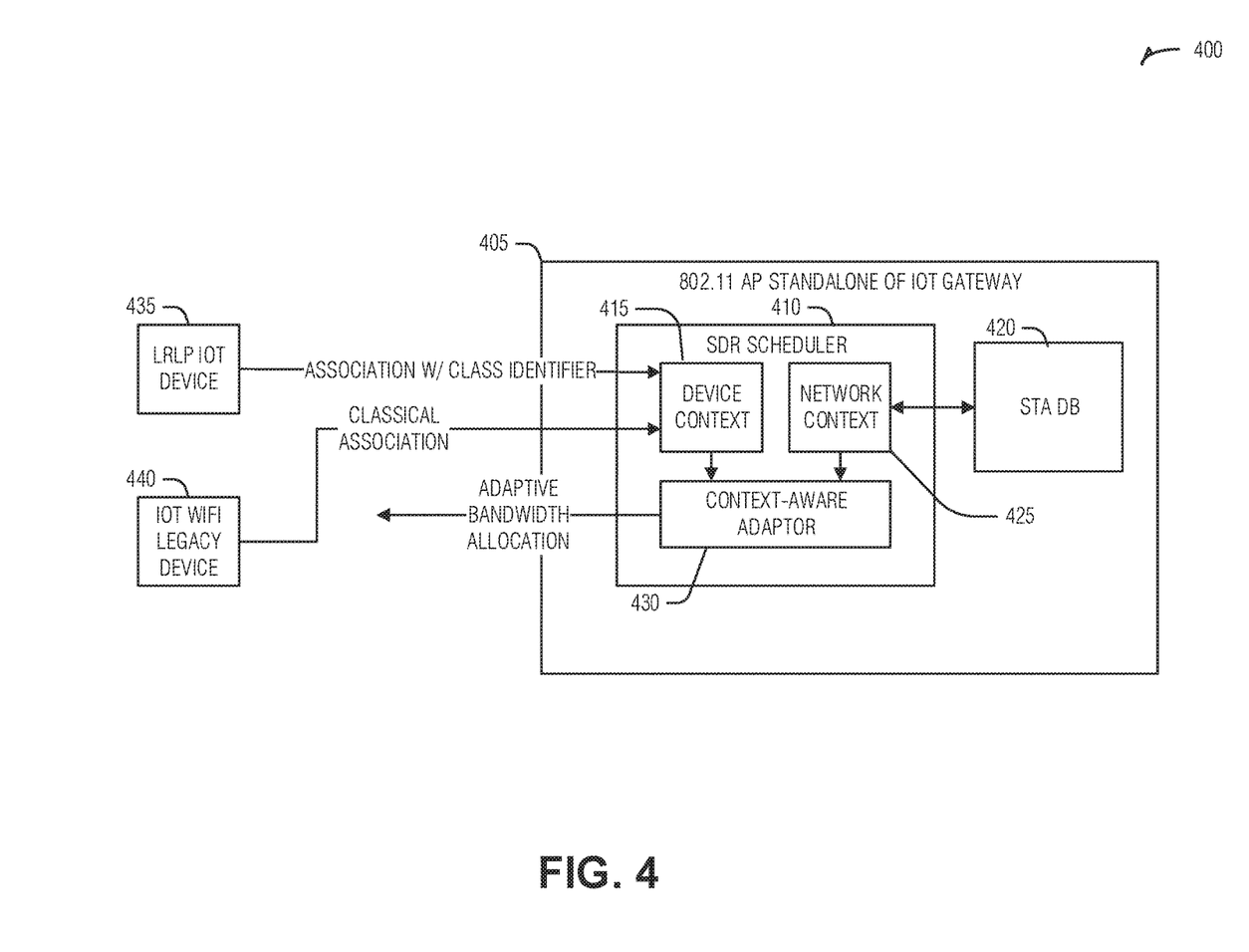
FIG. 4 illustrates a block diagram of an example of a system for a multi-class LRLP AP, according to an embodiment.

FIG. 4 illustrates a block diagram of an example of a system 400 for a multi-class LRLP AP, according to an embodiment. The system 400 includes an AP 405 with the embedded SDR scheduler 410 and a STA database 420. An association from an LRLP IoT device 435 is received. The device context of the LRLP device 435 is captured by a DCM 415. An NCM 425 maintains current STA associations and schedules in the STA database 420. The DCM 415 and the NCM 425 provide device and network context information to the CABA 430. The CABA 430 is arranged to implement dynamic bandwidth allocation to the LRLP device 435 while still engaging in legacy 802.11 communications with legacy device 440.

Figure 5:
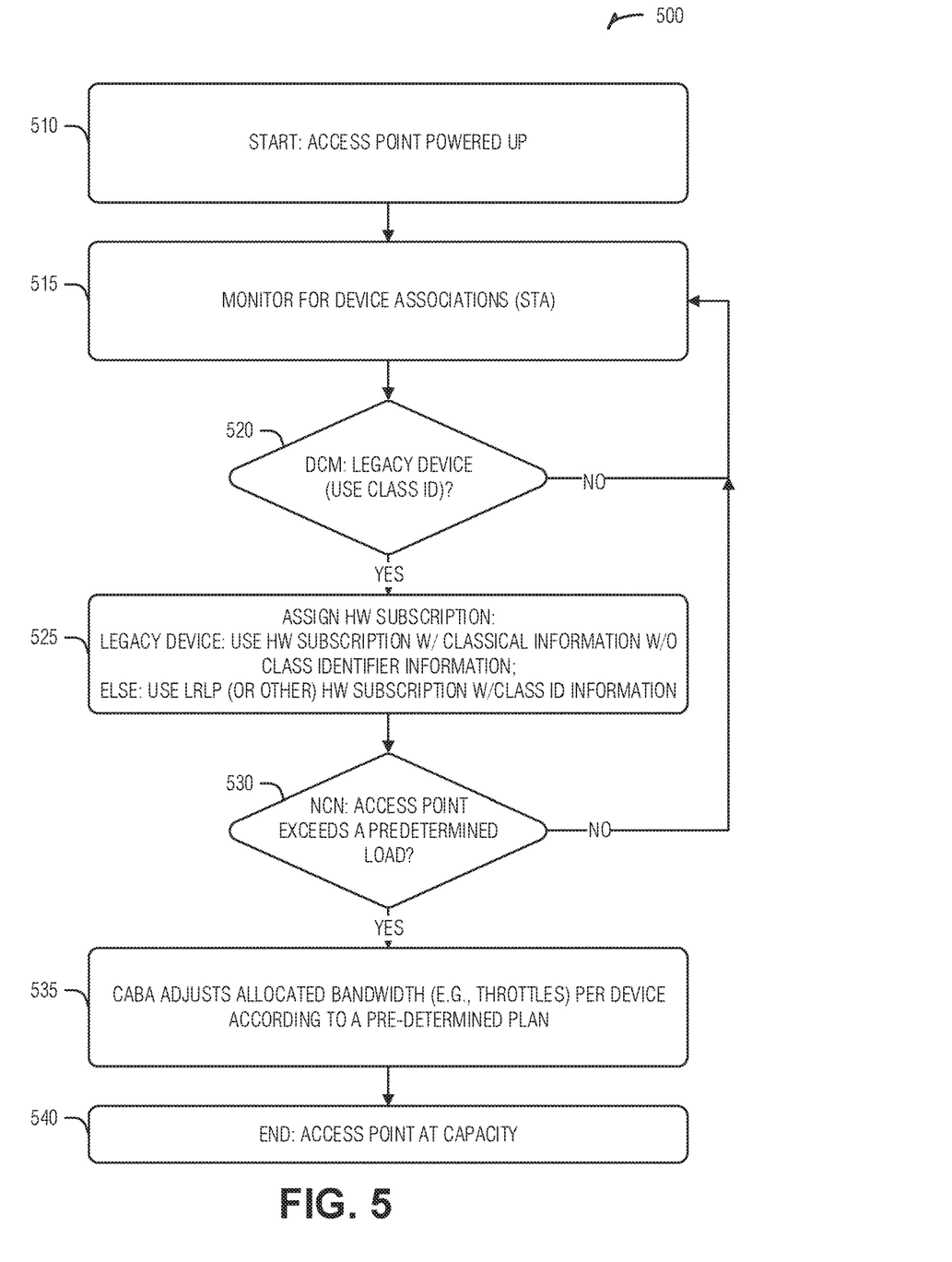
FIG. 5 illustrates a flow diagram of an example of a method for multi-class LRLP in an AP, according to an embodiment.

FIG. 5 illustrates a flow diagram of an example of a method 500 for multi-class LRLP in an AP, according to an embodiment. Operations of the method 500 are performed with computer hardware, such as that described below with respect to FIG. 7 (e.g., circuitry).

An AP is initialized (e.g., when it is powered on) (operation 510) to receive STA associations (operation 515). When an association is received, the AP determines whether a legacy 802.11 device is associating with the AP (decision 520). In an example, the absence of a class ID denotes that the STA is a legacy STA. Conversely, the existence of a class ID denotes an non-legacy device. If the STA is a legacy device, it is associated and the processing loop returns to monitoring for additional associations (operation 515).

If the STA is not a legacy device (e.g., it is an LRLP STA), hardware to communicate with the STA is subscribed to a transceiver chain. The hardware subscription is based on the class ID information and available hardware. In an example, the hardware is assigned (e.g., via the subscription) to a VM to handle communications with the STA (operation 525).

While accepting associations from a variety of STAs, the AP may determine whether a predetermined load (e.g., number of STAs) has been exceeded (decision 530). If not, the AP may continue accepting associations (operation 515). If the predetermined number of STAs has been exceeded, the AP (e.g., via a CABA) may adjust bandwidth for non-legacy STAs according to a predetermined plan (operation 535). Once plan parameters are met or exceeded (e.g., a minimum bandwidth has already been assigned to every associated non-legacy device), the AP may refuse new associations (operation 540).

Additional adaptations (e.g., different than adjusting bandwidth) may include antenna sharing among coexisting 802.11 devices (e.g., legacy and LRLP) or between different RF technologies (802.11 and 802.15.1 standards families). Further, spectrum division (e.g., allocating 2.4 GHz band to LRLP STAs and 5 GHz band to legacy STAs) may also occur.

The SDR scheduler solution described above is valuable because it allows 802.11 AP hardware to service existing devices and new devices (such as LRLP STAs) without extra cost (e.g., additional hardware) and with enhanced flexibility (e.g., to address changing device types).

Figure 6:
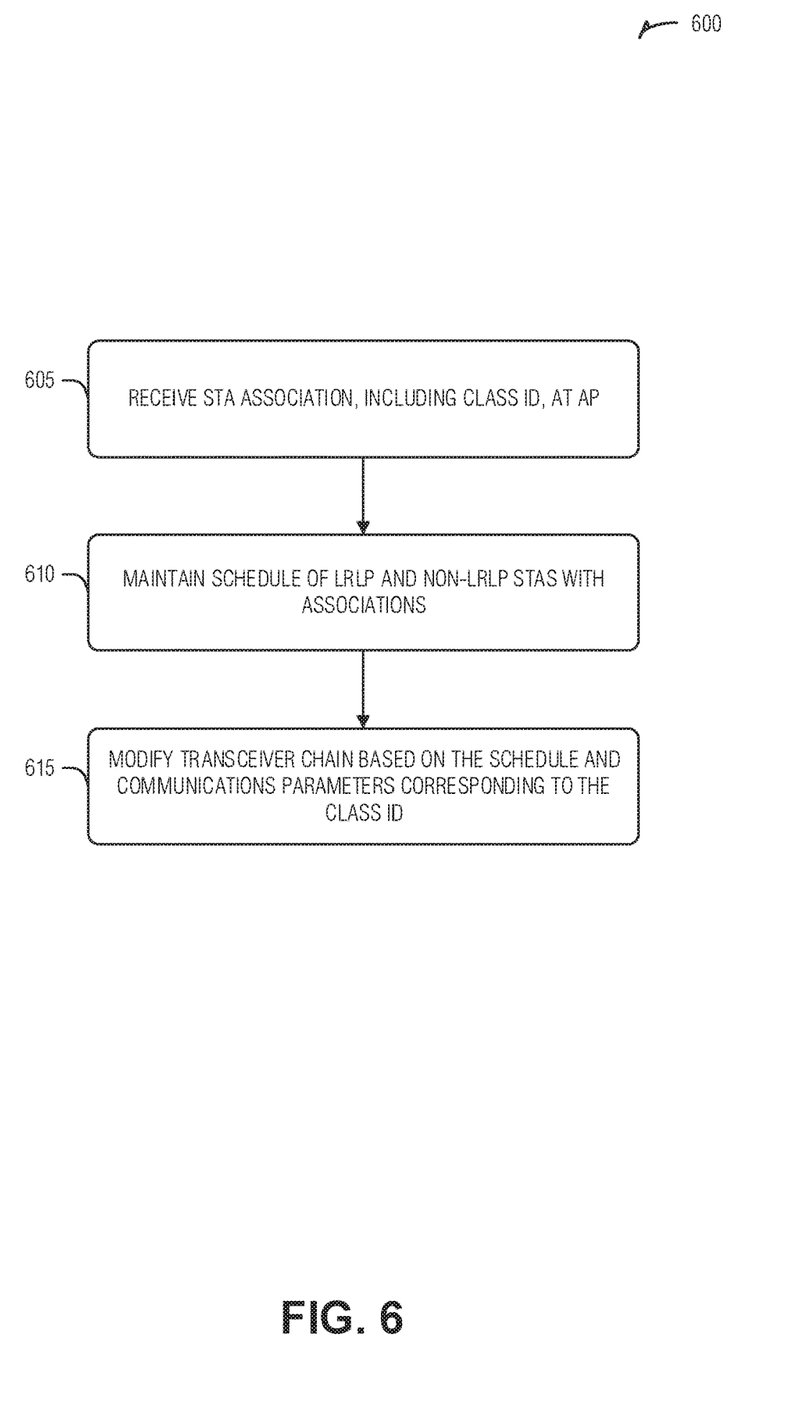
FIG. 6 illustrates a flow diagram of an example of a method for multi-class LRLP in an AP, according to an embodiment.

FIG. 6 illustrates a flow diagram of an example of a method 600 for multi-class LRLP in an AP, according to an embodiment. Operations of the method 600 are performed with computer hardware, such as that described below with respect to FIG. 7 (e.g., circuitry).

At operation 605, a STA association is received at the AP. Here, the association includes Class ID information. The Class ID information, in turn, includes a set of communication parameters. In an example, non-LRLP STAs do not submit a Class ID during association. In an example, non-LRLP STAs and the AP communicate in accordance with an 802.11 family of standards.

In an example, the communication parameters include a maximum or a minimum bandwidth. In an example, the communication parameters include a reporting interval. In an example, communication parameters include a power-type.

At operation 610, a schedule of LRLP and non-LRLP STAs with associations at the AP is maintained. In an example, maintaining the schedule of LRLP and non-LRLP STAs with associations at the AP includes scheduling multiple LRLP STAs on different bandwidth at the same time. Here, any single bandwidth allocation to the multiple LRLP STAs is less than a smallest bandwidth allocation to a non-LRLP STA at a different time. In an example, the smallest bandwidth allocation to a non-LRLP STA at the AP is twenty megahertz.

In an example, LRLP STA bandwidth in the schedule is reduced from a maximum based on a cardinality of LRLP STAs in the schedule. In an example, new LRLP STA associations are rejected when the cardinality of the LRLP STAs in the schedule reaches a threshold.

At operation 615, a transceiver chain is modified based on the schedule and the set of communication parameters to complete a communication with the STA. In an example, the communication is a downlink communication. In an example, modifying the transceiver chain based on the schedule, includes configuring a virtual machine to control an antenna used in the communication. In an example, configuring the virtual machine includes reconfiguring a FPGA to modify a signal to or from the antenna in accordance with a radio communication standard. In an example, configuring the virtual machine includes subscribing to a hardware resource of the AP. In an example, the subscription establishes a time-of-use window in which the virtual machine controls the hardware resource.

Figure 7:
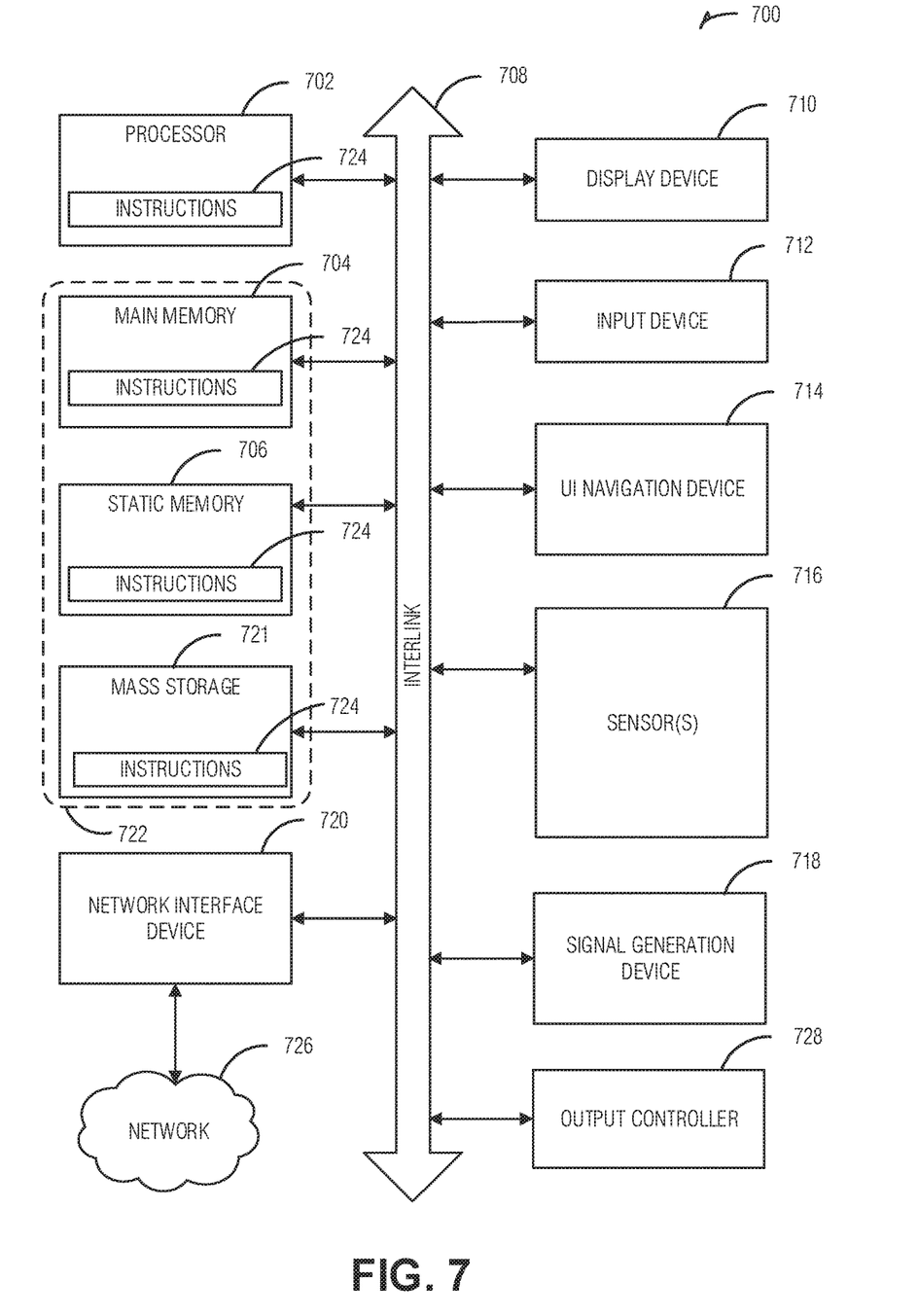
FIG. 7 is a block diagram illustrating an example of a machine upon which one or more embodiments may be implemented.

FIG. 7 illustrates a block diagram of an example machine 700 upon which any one or more of the techniques (e.g., methodologies) discussed herein may perform. Examples, as described herein, may include, or may operate by, logic or a number of components, or mechanisms in the machine 700. Circuitry (e.g., processing circuitry) is a collection of circuits implemented in tangible entities of the machine 700 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 700 follow.

In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be an access point, a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 700 may include a hardware processor 702 (e.g., a central processing unit (CPU), a graphics processing unit (GPU), a hardware processor core, or any combination thereof), a main memory 704, a static memory 706 (e.g., memory or storage for firmware, microcode, a basic-input-output (BIOS), unified extensible firmware interface (UEFI), etc.), and mass storage 721 (e.g., hard drive, tape drive, flash storage, or other block devices) some or all of which may communicate with each other via an interlink 708 (e.g., bus). The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 702, the main memory 704, the static memory 706, or the mass storage 716 may be, or include, a machine readable medium 722 on which is stored one or more sets of data structures or instructions 724 (e.g., software) embodying or utilized by any one or more of the techniques or functions described herein. The instructions 724 may also reside, completely or at least partially, within any of registers of the processor 702, the main memory 704, the static memory 706, or the mass storage 716 during execution thereof by the machine 700. In an example, one or any combination of the hardware processor 702, the main memory 704, the static memory 706, or the mass storage 716 may constitute the machine readable media 702. While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may be further transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks). Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software. A transmission medium is a machine readable medium.

Additional Notes & Examples

Example 1 is a system for a multi-class Long Range Low Power (LRLP) access point (AP), the system comprising: a transceiver chain to receive a station (STA) association at the AP, the association including Class Identifier (ID) information, the Class ID information including a set of communication parameters; and a controller to: maintain a schedule of LRLP and non-LRLP STAs with associations at the AP, the schedule including the STA; and modify the transceiver chain based on the schedule and the set of communication parameters to complete a communication with the STA.

In Example 2, the subject matter of Example 1 optionally includes wherein the communication parameters include a maximum or a minimum bandwidth.

In Example 3, the subject matter of any one or more of Examples 1-2 optionally include wherein the communication parameters include a reporting interval.

In Example 4, the subject matter of any one or more of Examples 1-3 optionally include wherein the communication parameters include a power-type.

In Example 5, the subject matter of any one or more of Examples 1-4 optionally include wherein non-LRLP STAs do not submit a Class ID during association.

In Example 6, the subject matter of any one or more of Examples 1-5 optionally include wherein, to maintain the schedule of LRLP and non-LRLP STAs with associations at the AP, the controller is to schedule multiple LRLP STAs on different bandwidths at the same time, wherein any single bandwidth allocation to the multiple LRLP STAs is less than a smallest bandwidth allocation to a non-LRLP STA at a different time.

In Example 7, the subject matter of Example 6 optionally includes wherein the smallest bandwidth allocation to a non-LRLP STA at the AP is twenty megahertz.

In Example 8, the subject matter of any one or more of Examples 6-7 optionally include wherein LRLP STA bandwidth in the schedule is reduced from a maximum based on a cardinality of LRLP STAs in the schedule.

In Example 9, the subject matter of Example 8 optionally includes wherein the controller is to reject new LRLP STA associations when the cardinality of the LRLP STAs in the schedule reaches a threshold.

In Example 10, the subject matter of any one or more of Examples 1-9 optionally include wherein, to modify the transceiver chain based on the schedule, the controller is to configure a virtual machine to control an antenna used in the communication.

In Example 11, the subject matter of Example 10 optionally includes wherein, to configure the virtual machine, the controller is to reconfigure a field programmable gate array (FPGA) to modify a signal to or from the antenna in accordance with a radio communication standard.

In Example 12, the subject matter of any one or more of Examples 10-11 optionally include wherein, to configure the virtual machine, the controller is to subscribe to a hardware resource of the AP, the subscription establishing a time-of-use window in which the virtual machine controls the hardware resource.

In Example 13, the subject matter of any one or more of Examples 1-12 optionally include wherein the communication is a downlink communication.

In Example 14, the subject matter of any one or more of Examples 1-13 optionally include family of standards.

Example 15 is a method for a multi-class Long Range Low Power (LRLP) access point (AP), the method comprising: receiving a station (STA) association at the AP, the association including Class Identifier (ID) information, the Class ID information including a set of communication parameters; maintaining a schedule of LRLP and non-LRLP STAs with associations at the AP, the schedule including the STA; and modifying a transceiver chain based on the schedule and the set of communication parameters to complete a communication with the STA.

In Example 16, the subject matter of Example 15 optionally includes wherein the communication parameters include a maximum or a minimum bandwidth.

In Example 17, the subject matter of any one or more of Examples 15-16 optionally include wherein the communication parameters include a reporting interval.

In Example 18, the subject matter of any one or more of Examples 15-17 optionally include wherein the communication parameters include a power-type.

In Example 19, the subject matter of any one or more of Examples 15-18 optionally include wherein non-LRLP STAs do not submit a Class ID during association.

In Example 20, the subject matter of any one or more of Examples 15-19 optionally include wherein maintaining the schedule of LRLP and non-LRLP STAs with associations at the AP includes scheduling multiple LRLP STAs on different bandwidths at the same time, wherein any single bandwidth allocation to the multiple LRLP STAs is less than a smallest bandwidth allocation to a non-LRLP STA at a different time.

In Example 21, the subject matter of Example 20 optionally includes wherein the smallest bandwidth allocation to a non-LRLP STA at the AP is twenty megahertz.

In Example 22, the subject matter of any one or more of Examples 20-21 optionally include wherein LRLP STA bandwidth in the schedule is reduced from a maximum based on a cardinality of LRLP STAs in the schedule.

In Example 23, the subject matter of Example 22 optionally includes rejecting new LRLP STA associations when the cardinality of the LRLP STAs in the schedule reaches a threshold.

In Example 24, the subject matter of any one or more of Examples 15-23 optionally include wherein modifying the transceiver chain based on the schedule includes configuring a virtual machine to control an antenna used in the communication.

In Example 25, the subject matter of Example 24 optionally includes wherein configuring the virtual machine includes reconfiguring a field programmable gate array (FPGA) to modify a signal to or from the antenna in accordance with a radio communication standard.

In Example 26, the subject matter of any one or more of Examples 24-25 optionally include wherein configuring the virtual machine includes subscribing to a hardware resource of the AP, the subscription establishing a time-of-use window in which the virtual machine controls the hardware resource.

In Example 27, the subject matter of any one or more of Examples 15-26 optionally include wherein the communication is a downlink communication.

In Example 28, the subject matter of any one or more of Examples 15-27 optionally include, wherein non-LRLP STAs and the AP communicate in accordance with an 802.11 family of standards.

Example 29 is at least one machine readable medium including instructions that, when executed by processing circuitry, cause the processing circuitry to perform any method of Examples 15-28.

Example 30 is a system comprising means to perform any method of Examples 15-28.

Example 31 is at least one machine readable medium including instructions for a multi-class Long Range Low Power (LRLP) access point (AP), the instructions, when executed by processing circuitry, cause the processing circuitry to perform operations comprising: receiving a station (STA) association at the AP, the association including Class Identifier (ID) information, the Class ID information including a set of communication parameters; maintaining a schedule of LRLP and non-LRLP STAs with associations at the AP, the schedule including the STA; and modifying a transceiver chain based on the schedule and the set of communication parameters to complete a communication with the STA.

In Example 32, the subject matter of Example 31 optionally includes wherein the communication parameters include a maximum or a minimum bandwidth.

In Example 33, the subject matter of any one or more of Examples 31-32 optionally include wherein the communication parameters include a reporting interval.

In Example 34, the subject matter of any one or more of Examples 31-33 optionally include wherein the communication parameters include a power-type.

In Example 35, the subject matter of any one or more of Examples 31-34 optionally include wherein non-LRLP STAs do not submit a Class ID during association.

In Example 36, the subject matter of any one or more of Examples 31-35 optionally include wherein maintaining the schedule of LRLP and non-LRLP STAs with associations at the AP includes scheduling multiple LRLP STAs on different bandwidths at the same time, wherein any single bandwidth allocation to the multiple LRLP STAs is less than a smallest bandwidth allocation to a non-LRLP STA at a different time.

In Example 37, the subject matter of Example 36 optionally includes wherein the smallest bandwidth allocation to a non-LRLP STA at the AP is twenty megahertz.

In Example 38, the subject matter of any one or more of Examples 36-37 optionally include wherein LRLP STA bandwidth in the schedule is reduced from a maximum based on a cardinality of LRLP STAs in the schedule.

In Example 39, the subject matter of Example 38 optionally includes wherein the operations include rejecting new LRLP STA associations when the cardinality of the LRLP STAs in the schedule reaches a threshold.

In Example 40, the subject matter of any one or more of Examples 31-39 optionally include wherein modifying the transceiver chain based on the schedule includes configuring a virtual machine to control an antenna used in the communication.

In Example 41, the subject matter of Example 40 optionally includes wherein configuring the virtual machine includes reconfiguring a field programmable gate array (FPGA) to modify a signal to or from the antenna in accordance with a radio communication standard.

In Example 42, the subject matter of any one or more of Examples 40-41 optionally include wherein configuring the virtual machine includes subscribing to a hardware resource of the AP, the subscription establishing a time-of-use window in which the virtual machine controls the hardware resource.

In Example 43, the subject matter of any one or more of Examples 31-42 optionally include wherein the communication is a downlink communication.

In Example 44, the subject matter of any one or more of Examples 31-43 optionally include, wherein non-LRLP STAs and the AP communicate in accordance with an 802.11 family of standards.

Example 45 is a system for a multi-class Long Range Low Power (LRLP) access point (AP), the system comprising: means for receiving a station (STA) association at the AP, the association including Class Identifier (ID) information, the Class ID information including a set of communication parameters; means for maintaining a schedule of LRLP and non-LRLP STAs with associations at the AP, the schedule including the STA; and means for modifying a transceiver chain based on the schedule and the set of communication parameters to complete a communication with the STA.

In Example 46, the subject matter of Example 45 optionally includes wherein the communication parameters include a maximum or a minimum bandwidth.

In Example 47, the subject matter of any one or more of Examples 45-46 optionally include wherein the communication parameters include a reporting interval.

In Example 48, the subject matter of any one or more of Examples 45-47 optionally include wherein the communication parameters include a power-type.

In Example 49, the subject matter of any one or more of Examples 45-48 optionally include wherein non-LRLP STAs do not submit a Class ID during association.

In Example 50, the subject matter of any one or more of Examples 45-49 optionally include wherein the means for maintaining the schedule of LRLP and non-LRLP STAs with associations at the AP include means for scheduling multiple LRLP STAs on different bandwidths at the same time, wherein any single bandwidth allocation to the multiple LRLP STAs is less than a smallest bandwidth allocation to a non-LRLP STA at a different time.

In Example 51, the subject matter of Example 50 optionally includes wherein the smallest bandwidth allocation to a non-LRLP STA at the AP is twenty megahertz.

In Example 52, the subject matter of any one or more of Examples 50-51 optionally include wherein LRLP STA bandwidth in the schedule is reduced from a maximum based on a cardinality of LRLP STAs in the schedule.

In Example 53, the subject matter of Example 52 optionally includes means for rejecting new LRLP STA associations when the cardinality of the LRLP STAs in the schedule reaches a threshold.

In Example 54, the subject matter of any one or more of Examples 45-53 optionally include wherein the means for modifying the transceiver chain based on the schedule include means for configuring a virtual machine to control an antenna used in the communication.

In Example 55, the subject matter of Example 54 optionally includes wherein the means for configuring the virtual machine include means for reconfiguring a field programmable gate array (FPGA) to modify a signal to or from the antenna in accordance with a radio communication standard.

In Example 56, the subject matter of any one or more of Examples 54-55 optionally include wherein the means for configuring the virtual machine include means for subscribing to a hardware resource of the AP, the subscription establishing a time-of-use window in which the virtual machine controls the hardware resource.

In Example 57, the subject matter of any one or more of Examples 45-56 optionally include wherein the communication is a downlink communication.

In Example 58, the subject matter of any one or more of Examples 45-57 optionally include, wherein non-LRLP STAs and the AP communicate in accordance with an 802.11 family of standards.

Example 59 is at least one machine-readable medium including instructions, which when executed by a machine, cause the machine to perform operations of any of the operations of Examples 1-58.

Example 60 is an apparatus comprising means for performing any of the operations of Examples 1-58.

Example 61 is a system to perform the operations of any of the Examples 1-58.

Example 62 is a method to perform the operations of any of the Examples 1-58.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B." "B but not A." and "A and B." unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second." and "third,"

etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A system for a multi-class Long Range Low Power (LRLP) access point (AP), the system comprising:
   a transceiver chain to receive a station (STA) association at the AP, the association including Class Identifier (ID) information, the Class ID information including a set of communication parameters; and
   a controller to:
   maintain a schedule of LRLP and non-LRLP STAs with associations at the AP, the schedule including the STA, wherein, to maintain the schedule of LRLP and non-LRLP STAs with associations at the AP, the controller is to schedule multiple LRLP STAs on different bandwidths at the same time, wherein any single bandwidth allocation to the multiple LRLP STAs is less than a smallest bandwidth allocation to a non-LRLP STA at a different time; and
   modify the transceiver chain based on the schedule and the set of communication parameters to complete a communication with the STA.

2. The system of claim 1, wherein non-LRLP STAs do not submit a Class ID during association.

3. The system of claim 1, wherein LRLP STA bandwidth in the schedule is reduced from a maximum based on a cardinality of LRLP STAs in the schedule.

4. The system of claim 3, wherein the controller is to reject new LRLP STA associations when the cardinality of the LRLP STAs in the schedule reaches a threshold.

5. The system of claim 1, wherein, to modify the transceiver chain based on the schedule, the controller is to configure a virtual machine to control an antenna used in the communication.

6. The system of claim 5, wherein, to configure the virtual machine, the controller is to reconfigure a field programmable gate array (FPGA) to modify a signal to or from the antenna in accordance with a radio communication standard.

7. The system of claim 5, wherein, to configure the virtual machine, the controller is to subscribe to a hardware resource of the AP, the subscription establishing a time-of-use window in which the virtual machine controls the hardware resource.

8. The system of claim 1, wherein the communications parameters includes at least one of a maximum bandwidth, a minimum bandwidth, a reporting interval, or a power type.

9. A method for a multi-class Long Range Low Power (LRLP) access point (AP), the method comprising:
   receiving a station (STA) association at the AP, the association including Class Identifier (ID) information, the Class ID information including a set of communication parameters;
   maintaining a schedule of LRLP and non-LRLP STAs with associations at the AP, the schedule including the STA, wherein maintaining the schedule of LRLP and non-LRLP STAs with associations at the AP includes scheduling multiple LRLP STAs on different bandwidths at the same time, wherein any single bandwidth allocation to the multiple LRLP STAs is less than a smallest bandwidth allocation to a non-LRLP STA at a different time; and
   modifying a transceiver chain based on the schedule and the set of communication parameters to complete a communication with the STA.

10. The method of claim 9, wherein non-LRLP STAs do not submit a Class ID during association.

11. The method of claim 9, wherein LRLP STA bandwidth in the schedule is reduced from a maximum based on a cardinality of LRLP STAs in the schedule.

12. The method of claim 11, comprising rejecting new LRLP STA associations when the cardinality of the LRLP STAs in the schedule reaches a threshold.

13. The method of claim 9, wherein modifying the transceiver chain based on the schedule includes configuring a virtual machine to control an antenna used in the communication.

14. The method of claim 13, wherein configuring the virtual machine includes reconfiguring a field programmable gate array (FPGA) to modify a signal to or from the antenna in accordance with a radio communication standard.

15. The method of claim 13, wherein configuring the virtual machine includes subscribing to a hardware resource of the AP, the subscription establishing a time-of-use window in which the virtual machine controls the hardware resource.

16. The method of claim 9, wherein the communications parameters includes at least one of a maximum bandwidth, a minimum bandwidth, a reporting interval, or a power type.

17. At least one non-transitory machine readable medium including instructions for a multi-class Long Range Low Power (LRLP) access point (AP), the instructions, when executed by processing circuitry, cause the processing circuitry to perform operations comprising:
   receiving a station (STA) association at the AP, the association including Class Identifier (ID) information, the Class ID information including a set of communication parameters;
   maintaining a schedule of LRLP and non-LRLP STAs with associations at the AP, the schedule including the STA, wherein maintaining the schedule of LRLP and non-LRLP STAs with associations at the AP includes scheduling multiple LRLP STAs on different bandwidths at the same time, wherein any single bandwidth allocation to the multiple LRLP STAs is less than a smallest bandwidth allocation to a non-LRLP STA at a different time; and
   modifying a transceiver chain based on the schedule and the set of communication parameters to complete a communication with the STA.

18. The at least one machine readable medium of claim 17, wherein non-LRLP STAs do not submit a Class ID during association.

19. The at least one machine readable medium of claim 17, wherein LRLP STA bandwidth in the schedule is reduced from a maximum based on a cardinality of LRLP STAs in the schedule.

20. The at least one machine readable medium of claim 19, wherein the operations include rejecting new LRLP STA associations when the cardinality of the LRLP STAs in the schedule reaches a threshold.

21. The at least one machine readable medium of claim 17, wherein modifying the transceiver chain based on the schedule includes configuring a virtual machine to control an antenna used in the communication.

22. The at least one machine readable medium of claim 21, wherein configuring the virtual machine includes reconfiguring a field programmable gate array (FPGA) to modify a signal to or from the antenna in accordance with a radio communication standard.

23. The at least one machine readable medium of claim 21, wherein configuring the virtual machine includes subscribing to a hardware resource of the AP, the subscription establishing a time-of-use window in which the virtual machine controls the hardware resource.

24. The at least one machine readable medium of claim 17, wherein the communications parameters includes at least one of a maximum bandwidth, a minimum bandwidth, a reporting interval, or a power type.

* * * * *

UNITED STATES PATENT AND TRADEMARK OFFICE
CERTIFICATE OF CORRECTION

PATENT NO. : 10,225,851 B2  Page 1 of 1
APPLICATION NO. : 15/487670
DATED : March 5, 2019
INVENTOR(S) : Ghosh et al.

It is certified that error appears in the above-identified patent and that said Letters Patent is hereby corrected as shown below:

On the Title Page

In item (54), and in the Specification, in Column 1, Line 1, in "Title", delete "MULTI-CAST" and insert --MULTI-CLASS-- therefor Signed and Sealed this
Twenty-sixth Day of January, 2021

Drew Hirshfeld
*Performing the Functions and Duties of the
Under Secretary of Commerce for Intellectual Property and
Director of the United States Patent and Trademark Office*